United States Patent
Johne

(10) Patent No.: US 7,052,217 B2
(45) Date of Patent: May 30, 2006

(54) MULTIPLE CUTTING EDGE ROTARY TOOL

(75) Inventor: Frank Johne, Grossenhain-Zschauitz (DE)

(73) Assignee: Johne + Co. Präzisionswerkzeuge GmbH, Dorsten (DE)

( * ) Notice: Subject to any disclaimer, the term of this patent is extended or adjusted under 35 U.S.C. 154(b) by 0 days.

(21) Appl. No.: 10/486,279

(22) PCT Filed: Aug. 8, 2002

(86) PCT No.: PCT/EP02/08896

§ 371 (c)(1),
(2), (4) Date: Feb. 9, 2004

(87) PCT Pub. No.: WO03/013769

PCT Pub. Date: Feb. 20, 2003

(65) Prior Publication Data

US 2004/0184893 A1    Sep. 23, 2004

(30) Foreign Application Priority Data

Aug. 8, 2001    (DE)    ............... 101 39 064

(51) Int. Cl.
B23B 29/03    (2006.01)

(52) U.S. Cl. ............ 408/156; 408/161; 408/168; 82/1.4

(58) Field of Classification Search ........... 82/1.4; 408/153, 156, 158, 161, 168, 169, 172
See application file for complete search history.

(56) References Cited

U.S. PATENT DOCUMENTS

| 2,138,727 | A | | 11/1938 | Cogsdill | |
|---|---|---|---|---|---|
| 3,530,745 | A | * | 9/1970 | Milewski | .............. 408/158 |
| 3,664,755 | A | | 5/1972 | Carns | |
| 3,918,826 | A | * | 11/1975 | Friedline | .............. 408/154 |
| 4,318,647 | A | * | 3/1982 | Erkfritz | .............. 408/153 |
| 4,416,569 | A | * | 11/1983 | Yamakage et al. | ......... 408/4 |
| 4,447,177 | A | * | 5/1984 | Ochiai et al. | .............. 408/161 |
| 4,606,680 | A | * | 8/1986 | Striegl | .............. 408/156 |

(Continued)

FOREIGN PATENT DOCUMENTS

DE    198 27 778 A1    12/1999

*Primary Examiner*—Boyer D. Ashley
*Assistant Examiner*—Michael W. Talbot
(74) *Attorney, Agent, or Firm*—Cohen, Pontani, Lieberman & Pavane

(57) ABSTRACT

The invention relates to a multiple cutting edge rotary tool having a radial individual adjustment of each cutting edge or having a central adjustment for all cutting edges together. The multiple cutting edge rotary tool used for machining has a number of holders that have, in the front part, cavities for accommodating cutting plates and have, in the area between their ends, a hole for passing through a fixing device with which each holder can be fixed to a support. The holder, on its portion that supports the cutting plate, can be elastically deflected in relation to a support by means of an adjusting device. In addition, the holder is provided with an opening and forms a parallel spiral spring arrangement whereby the cutting plate, during its adjustment, is essentially subjected to a parallel displacement with regard to the cutting edge. The adjusting device is provided in the form of a central adjusting screw which, as an axially adjustable differential screw, retains, by means of a lifting motion of the differential screw, the holder in a manner that permits it to be radially displaced in relation to its support and without play. The retention of said holder is effected by adjustable pressure pieces that are supported on parts of the adjusting screw.

9 Claims, 7 Drawing Sheets

U.S. PATENT DOCUMENTS

| | | | | |
|---|---|---|---|---|
| 4,648,757 A | * | 3/1987 | Plummer | 408/12 |
| 4,692,069 A | | 9/1987 | Kieninger | |
| 4,772,159 A | | 9/1988 | Bloink | |
| 4,780,029 A | * | 10/1988 | Beck | 407/89 |
| 4,786,217 A | * | 11/1988 | Johne | 408/156 |
| 4,847,975 A | * | 7/1989 | Santi | 29/428 |
| 4,878,787 A | * | 11/1989 | Hunt | 408/181 |
| 5,391,023 A | * | 2/1995 | Basteck | 408/146 |
| 5,427,480 A | * | 6/1995 | Stephens | 408/168 |
| 5,478,178 A | * | 12/1995 | Pawlick | 408/153 |
| 5,709,510 A | * | 1/1998 | Scheer | 408/156 |
| 5,857,813 A | * | 1/1999 | Kress et al. | 408/1 R |
| 6,012,880 A | * | 1/2000 | Horn et al. | 408/156 |
| 6,247,878 B1 | * | 6/2001 | Musil et al. | 408/1 R |
| 6,312,200 B1 | * | 11/2001 | Graham et al. | 408/1 R |
| 6,655,883 B1 | * | 12/2003 | Maar | 408/158 |
| 6,846,136 B1 | * | 1/2005 | Brock et al. | 408/154 |

* cited by examiner

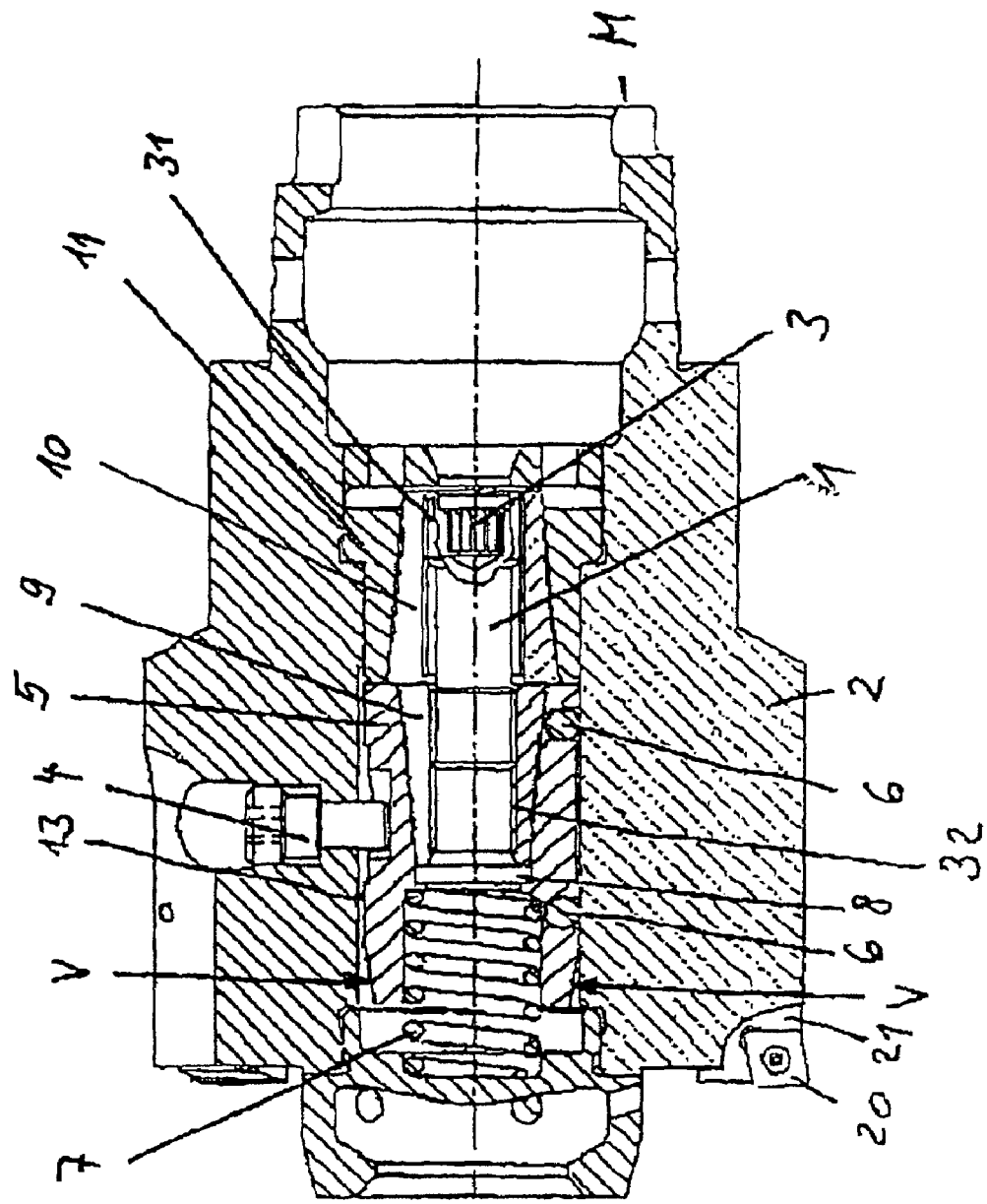

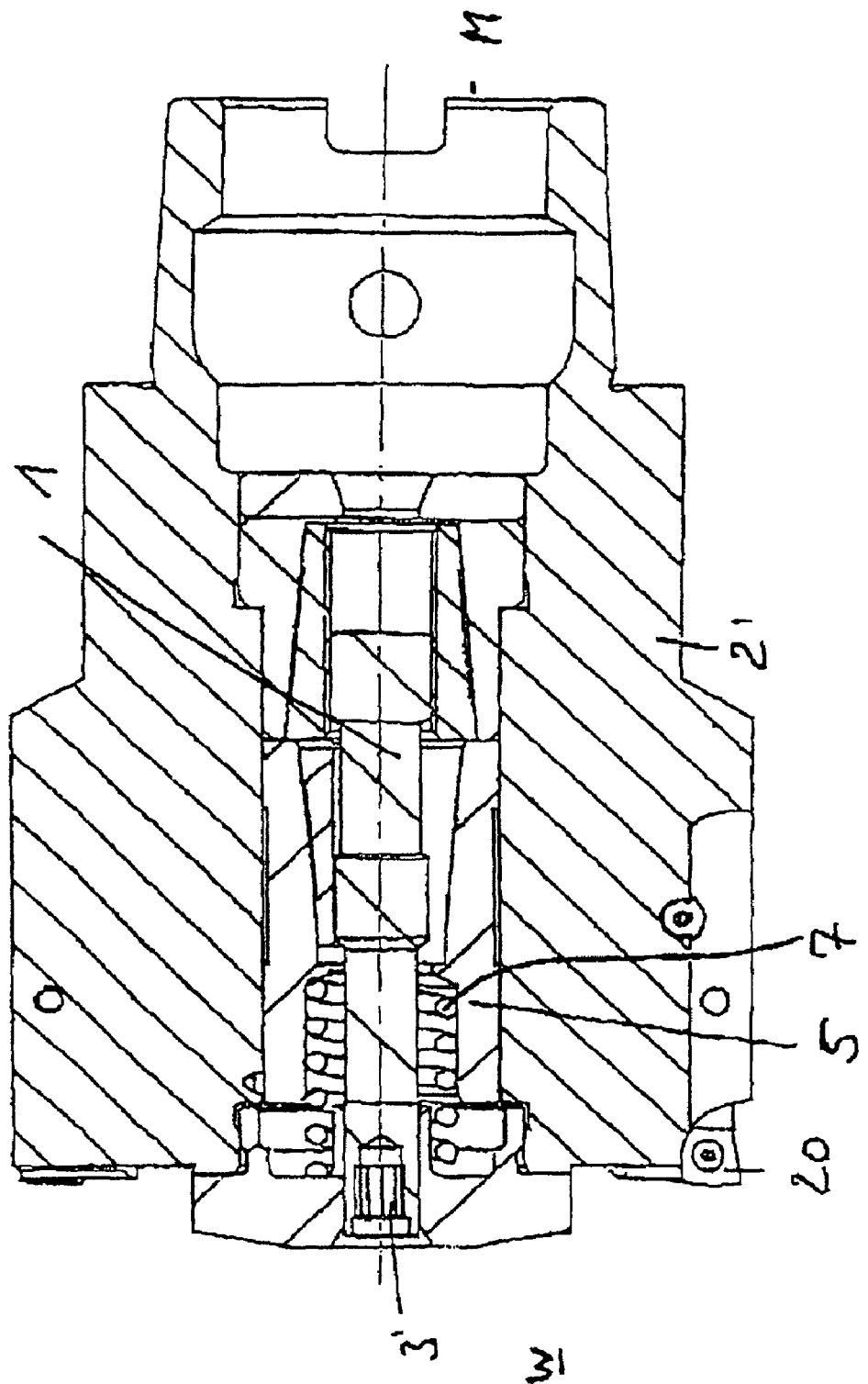
FIG.3.6

MULTIPLE CUTTING EDGE ROTARY TOOL

PRIORITY CLAIM

This is a U.S. national stage of application No. PCT/EP02/08896, filed on 8 Aug. 2002. Priority is claimed on that application and on the following application(s): Country: Germany, Application No.: 101 39 064.5, Filed: 8 Aug. 2001.

BACKGROUND OF THE INVENTION

1. Field of the Invention

The invention relates to a multi-edged rotary tool with individual adjustment in a radial direction of each cutting tip or with central adjustment for all the cutting tips together.

2. Description of the Prior Art

DE 198 27 778 A1 discloses a rotary tool in which a cutting tip can be radially adjusted in a sensitive manner on a parallel spring by means of an adjusting screw without a stick-slip effect.

The tool is conceived as a single cutter; a plurality of cutting tips may be arranged one behind the other on a carrier. It can be used in particular for small bores.

Such a tool constitutes a unit of small construction. Its dimensions can be selected in such a way that it is also suitable for small bore hole diameters. In this case, axial adjustability can also be readily achieved, as is often necessary in order to produce, for example, stepped bores. For all that, however, the tool is distinguished by especially advantageous adjustability in the radial direction without another variable, in particular the setting angle, causing undesirable effects in the process. This is achieved in one embodiment by the holder being designed as a parallel bending spring arrangement. This refers to a configuration in which the head part of the holder, i.e. the part carrying the cutting tip, essentially experiences a displacement parallel to itself using elastic bending of parts of the holder.

The design can be made in such a way that the holder is essentially without load in the deflected state, and an elastic restoring force which counteracts a deflection only occurs when the adjusting device is actuated from a zero or initial position. In an especially advantageous manner, however, the holder is already held under prestress in the nondeflected state, so that freedom from play is ensured from the outset. This can be achieved by the holder forming a spring being firmly screwed to the parent body and by bearing directly against the adjusting screw in the process.

There are various possible embodiments for the aperture provided for this parallel spring design, namely those having a recess in the corner regions, which prevent notch stresses. In a very favorable embodiment, the aperture essentially has the shape of a U with a central fastening tongue.

The adjusting device is designed as a screw which engages in a thread of the parent part and is supported on the parent part. In an especially expedient embodiment, the adjusting screw together with the holder has such a wedge-surface pair that no self-locking can occur. As a result, the wedge surfaces can slide when the screw is turned in the release direction as a result of the high prestress, i.e. the holder always stays in contact with the screw.

The wedge-surface pair between holder and adjusting screw can be produced, for example, by a convex or conical section of the screw, paired with a vertical section of the holder, or also vice versa, or by mixed forms. The important factors are the direct contact of the elements and their effective direction relative to one another.

With such an adjusting device, it is possible to deflect the cutting tip radially to a finer degree than 3 µm and to produce correspondingly accurate bores. The repetitive accuracy is so precise that the movement of the adjusting screw at an annular scale arranged thereon relative to a reference point on the parent body can be assigned to a corresponding radial adjustment of the cutting tip. A circular measure of 1 mm at the screw corresponds, for example, to $\frac{1}{1000}$ mm at the cutting tip. This repetitive accuracy is a prerequisite for maintaining quality conditions required by DIN/ISO 9000 ff.

The use of such a design for other boring purposes is not disclosed; in particular bore diameters of about 10 to 50 mm are to be realized.

SUMMARY OF THE INVENTION

The object of the present invention is provide a multi-edge rotary tool in which each cutting edge is adjustable in the radial direction.

Accordingly to a first embodiment, a multi-edged rotary tool for machining has a plurality of holders. Front parts of the holders have receptacles for cutting tips and, in the region between their ends, have a holes for the passage of a fastener for fixing each holder on a carrier. Each of the holders, at its part carrying the cutting tip, being capable of being individually elastically deflected radially relative to a support by means of an adjusting device.

The number of cutting tips may be 3, 5, 7 or another multiple, the number being selected in such a way that no chatter marks are produced during the cutting of a bore, each cutting tip cutting the full circle. Such a tool can be advantageously used, for example, for cylinder bores in vehicle engines, in particular also on transfer lines. In this case, the individual cutting tips are preset to the desired diameter and can in each case be reset if required during operation by an individual adjusting device at each wedge-surface pair for each cutting tip. Apart from the specific problem of accommodating the multiplicity of cutting tips with such a parallel spring arrangement on the circumference of a boring bar or of a tool head, there is still the problem of being able to clearly prestress the interacting cutting tips. As already known per se from the prior art, the holder of each cutting tip is provided with a prestressing device which is accessible and adjustable from the circumference of the tool once the holder has been basically fixed on the tool head. The production tolerances are thus primarily compensated for, whereas the adjusting device is used for the diameter adaptation.

In a second embodiment, a multi-edged rotary tool, is provided with a special adjusting device which is designed as a central adjusting screw which, brings the holder radially into position relative to its carrier by means of a stroke movement by adjustable pressure pieces which are supported on a taper on the differential screw. The central adjusting screw may comprise an axially adjustable differential screw. Here, the adjusting devices provided individually for each holder according to the first embodiment are therefore replaced with pressure pieces which are moved by a central adjusting device and effect the elastic deflection of the holder, resulting in a radial infeed of the cutting tips for producing a bore diameter different from that set beforehand. In order to permit such a central adjustment, each parallel spring and each holder must be preset on its own with a screw and a pressure bolt in order to compensate for production tolerances and possible tolerances of the cutting blades and the like and to set the rotary tool to a respective round bore diameter. This must be done separately for each bore diameter to be produced, since tolerances, at least to the accuracies aimed at here within the μm range, can be expected time after time when changing over from one cutting tip to another or when exchanging the tip on account of a tip fracture.

In the ideal case, therefore, all the cutting tips, e.g. the 5 cutting tips shown in the exemplary embodiment, are oriented at the circumference of the tool uniformly for one boring diameter before they can be accurately fed in by the central adjusting device to $\frac{1}{1000}$ mm if a random sample after the initial start-up of production, i.e. after a first cut of a bore, shows that such an adjustment is necessary.

To this end, the spindle of a machine tool, via a servomotor, engages in a coupling on the machine tool side or rear side of the rotary tool and rotates the differential screw by a defined dimension or a definable amount. This amount depends on the selected pitches of the thread and taper on the differential screw and the infeed dimension for an increase or decrease in the bore diameter.

Alternatively, the differential screw may be driven from the head of the tool by the machine rotating, for example, a device inside a transfer line, against a fixed screwdriver and the machine tool spindle by a predetermined dimension which has been determined beforehand by a computer in combination with a stepping motor. In this way, in continuous operation, during a tool change, a diameter change can thus be achieved by a possibly relevant additionally required relative movement of the differential screw.

In addition, provision may of course be made for the machine tool spindle to serve as a torque arm when it is stopped and for a machine operator to turn this differential screw from the head of the tool manually or in a powered manner by means of an appropriate tool, thus enabling the differential screw to cover the required distance. The differential screw essentially comprises a shaft with two external threads of different pitch, these threads engaging in two sleeves with conical outer sections. By axial displacement of the nut-like sleeves relative to one another, a differential sleeve provided with a tapered or convex outer contour is pushed in or out by the nut-like sleeves and at the same time, transversely to the axis of the differential screw via a pressure piece which is supported on the differential sleeve, effects the expansion or contraction of the parallel spring arrangements concentrically, since the pressure pieces are under prestress.

The conicity or amount of taper of the sleeves can be selected in such a way that a defined differential movement is in any case produced if the differential screw is rotated and sleeve parts are axially displaced.

A problem with the accuracy of the infeed may be present if the taper parts of the sleeves have not been mounted radially free of play relative to the differential screw. Provision is therefore made in an embodiment of the invention for the taper parts of the differential screw to be mounted at the circumference according to the proven steady rest principle, at least some of the bearing elements of the steady rest preferably likewise having a prestress in the radial direction by corresponding spring elements.

In order to achieve an axial movement of the differential sleeve, the taper part or a plurality of taper parts of all sleeves must be prevented from rotating by an appropriate element, e.g. a screw or a pin which can be inserted from the outside into a corresponding recess, that is to say said taper parts form a torque arm. Instead of a using the above described mounting to prevent rotation of the taper parts of all sleeves, spring elements known per se may also used for the preventing rotation of the taper parts, if the person skilled in the art makes an appropriate selection.

The thread of the differential screw or the threads in the taper parts must be designed free of play relative to the elements to be moved from the machine side or from the tool head side in order to maintain the accuracy requirements. Provision is therefore made for the thread to also be made free of play, for example by elastic nuts with longitudinal slots which are to be fitted during the assembly and sit on the thread under tension, so that ultimately tight rotation, free of play, of the thread is achieved.

An axial spring can achieve the effect that an adjustment of the differential screw is also possible only against spring pressure and thus no play occurs during the reversal of the rotary movement.

The problem and the advantage of the present invention are explained in the attached drawings and claims with reference to exemplary embodiments.

BRIEF DESCRIPTION OF THE DRAWINGS

FIG. 3 is a sectional view of the cutting along line III—III according to FIG. 2 in a first embodiment;

FIGS. 3a and 3b are sectional views of a cutting tool similar to FIG. 3, further embodiments;

DETAILED DESCRIPTION OF THE PREFERRED EMBODIMENTS

Figure 6:
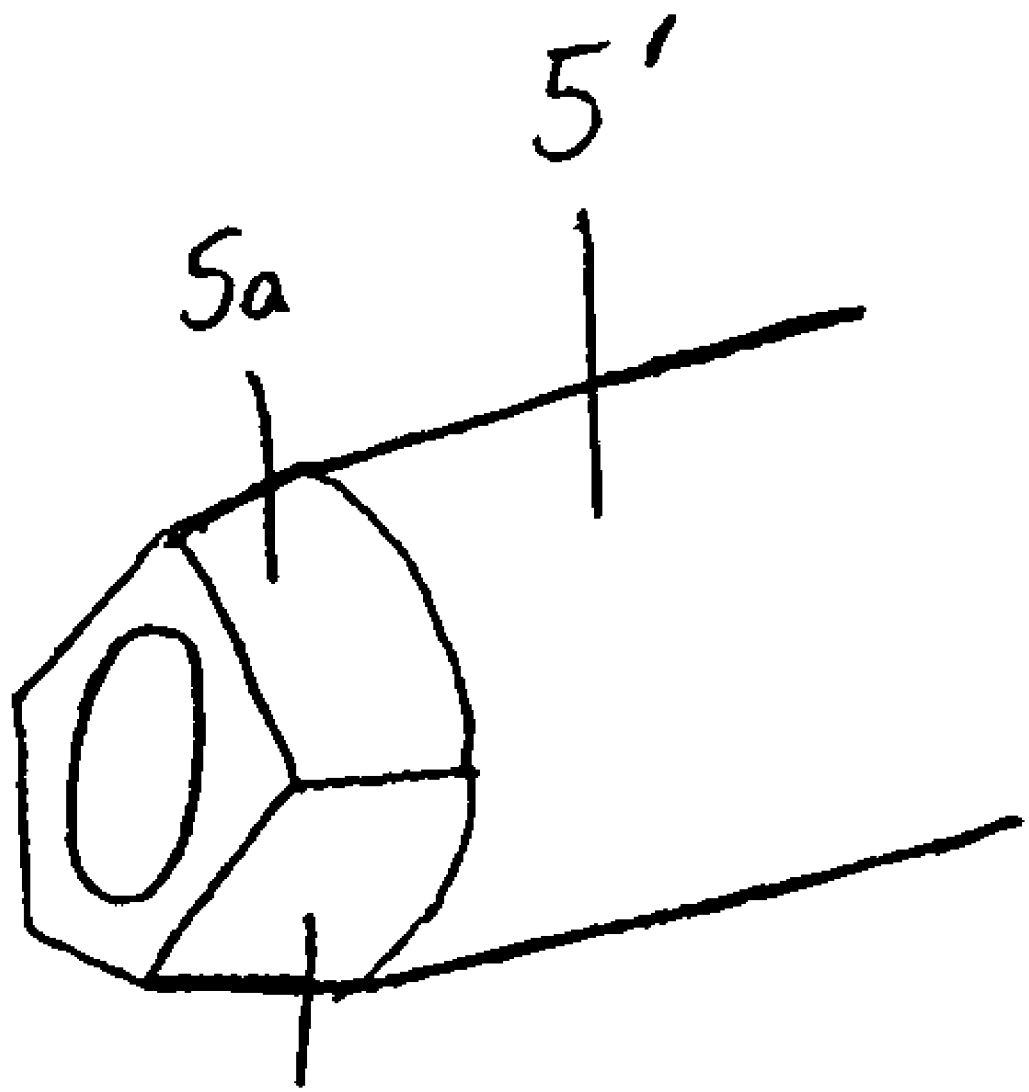
FIG. 6 is a perspective view of another embodiment of a sleeve of the cutting tool of FIG. 3 having a frustum of a pyramid.

FIGS. 1, 2, 2a, 3, and 4 show a first embodiment of a multi-edged rotary tool according to the invention. Arranged in a tool head 2 is a differential screw 1 which, via a multiple-spline groove 3 in which the spindle of a machine M engages via a servomotor, is axially adjustable in a rotational manner and in the process engages by means of threads 31 and 32 in complementary threads in taper sleeves 9, 10 (FIG. 3). The threads 31, 32 have different pitches, so that the sleeve 5, which can only move axially on account of driving pin 4, is ultimately displaced against the pressure of a spring 7. At the same time, the differential screw 1 is supported in a sleeve 11 via a sleeve 10, 50 that the taper sleeve 9 and thus sleeve 5 are displaced axially forward or rearward depending on the direction of rotation of the servomotor. The maximum deflection of the spring 7 is shown in FIG. 3, the taper sleeves 9 and 10 bearing against one another at this maximum deflection. During the displacement, a radial adjustment of the pressure pieces V is effected at a tapered outer contour 13 of the sleeve 5 connected to the differential screw 1, a factor which can be seen in particular in FIG. 4. The sleeve 5 may alternatively be designed as sleeve 5' in FIG. 6 with a frustum of a pyramid with a number of surfaces 5a corresponding to the number of cutting tips 20 used at the circumference of the tool. The pressure pieces V act on holders 21, on which cutting tips 20 sit, and thus vary the diameter to be produced by the cutting tips 20. The holders 21 include a parallel spring design having a U-shaped aperture 120 with a central fastening tongue 121. Instead of the pressure pieces V shown, eccentric elements or toggle-lever elements may also be used for the infeed of the cutting tips 20, in which case the displacement of the elements, which is not always linear and is effected by the central adjustment, is calculated automatically via a computer or controller (not shown).

The holders 21 are fixed by pins 23 such that the holders 21 can be rotated about the pins. Screws 22 may be used to preset the holders with prestress against the carrier 2 in order to avoid coarse tolerances.

For an accurate infeed, the differential screw 1 is held free of play radially by the central bore for differential screw and sleeves in the tool 2 having a widened portion (here shown exaggerated) at the outer contour 13. Two spring elements 6 lying opposite this widened portion of the outer contour 13 resiliently hold the sleeve 5 in a steady position. As a result, an axial displacement of the sleeve 5 is permitted, but no lifting can take place from this position in the radial direction on account of the prestressing by the spring elements 6. Instead of this arrangement shown in FIG. 3, spring elements which pass through the sleeve 5, e.g. at location 8, and/or the tool body 2 and having the same effect can also be used. In the solution shown, the spring elements 6 are designed as plastic balls pressed into the taper sleeve 5.

The thread on differential screw 1 and taper sleeves 9, 10 should also be free of play. This is preferably realized by conical sleeves or nuts 9, 10 which have a longitudinal slot according to FIG. 3. The taper sleeves 9, 10 are pushed into the outer sleeves 5, 11 of complementary conical design to such an extent that they are pressed together, so that ultimately the thread becomes tight. The sleeves 9, 10 are then fixed, e.g. by adhesive bonding or screwing (not shown). In addition, the axial spring 7 provides for the elimination of the reverse play.

In addition, the accurate infeed or adjustment of the cutting tips 20 with infeed rates of $\frac{1}{1000}$ mm requires tribological optimization at all contact pairs under load, which has to be correspondingly measured by the person skilled in the art. An adjusting torque at the differential screw 1 of less than 20 Nm has proved to be advantageous.

Figure 4:
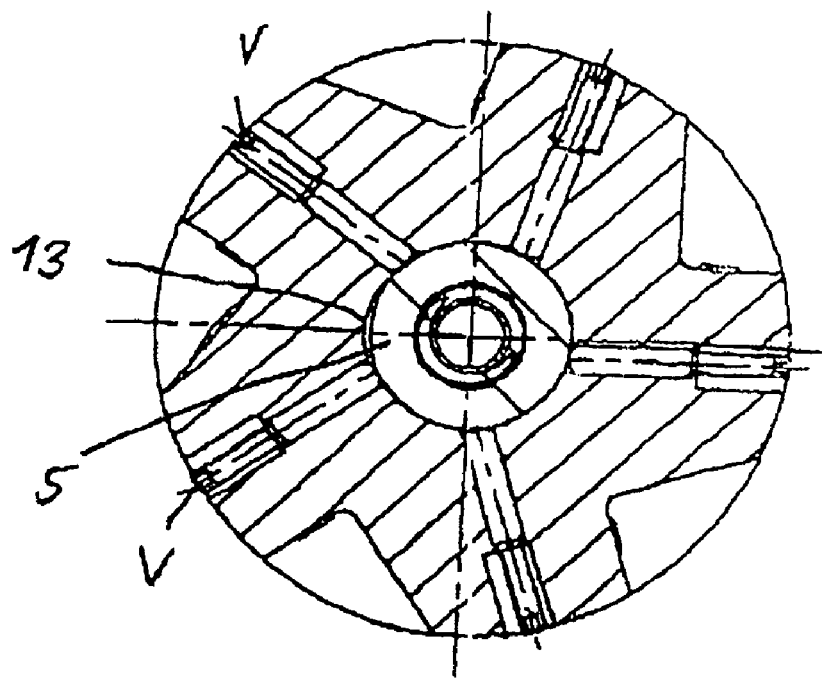
FIG. 4 is a sectional view of the cutting tool along line IV—IV in FIG. 2.
Figure 1:
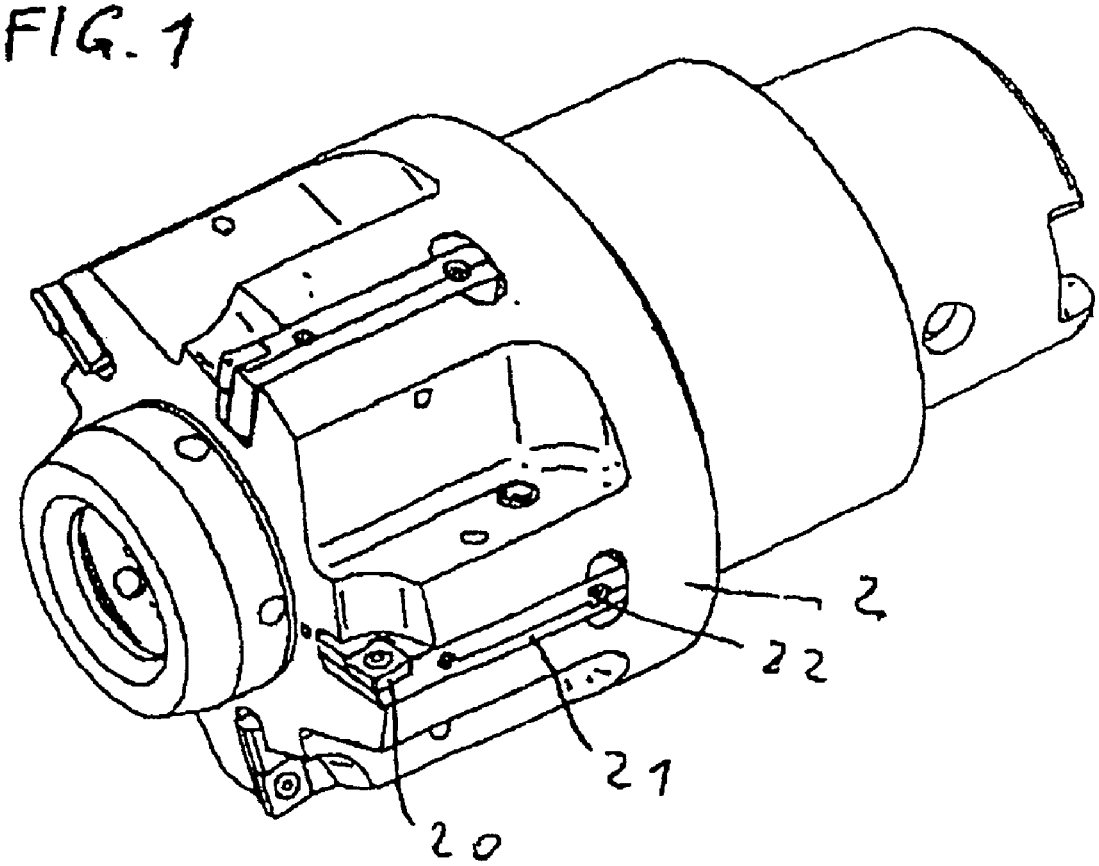
FIG. 1 is a perspective side view of a cutting tool according to an embodiment of the present invention.
Figure 2A:
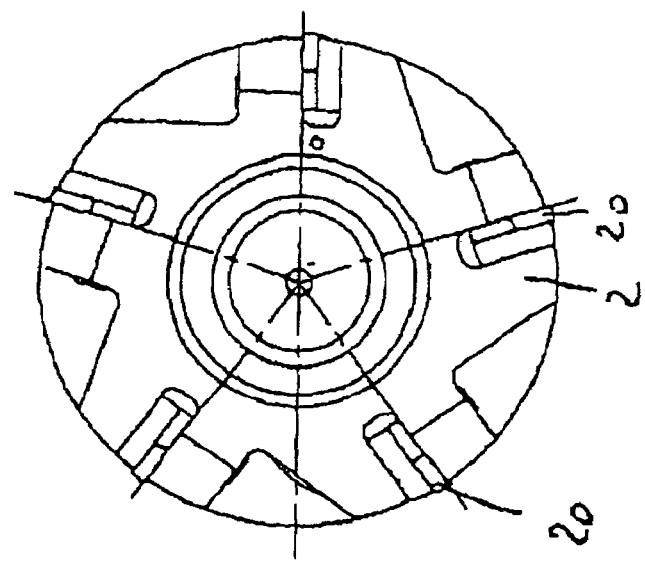
FIG. 2a is a front view of the tool of FIG. 2.
Figure 2:
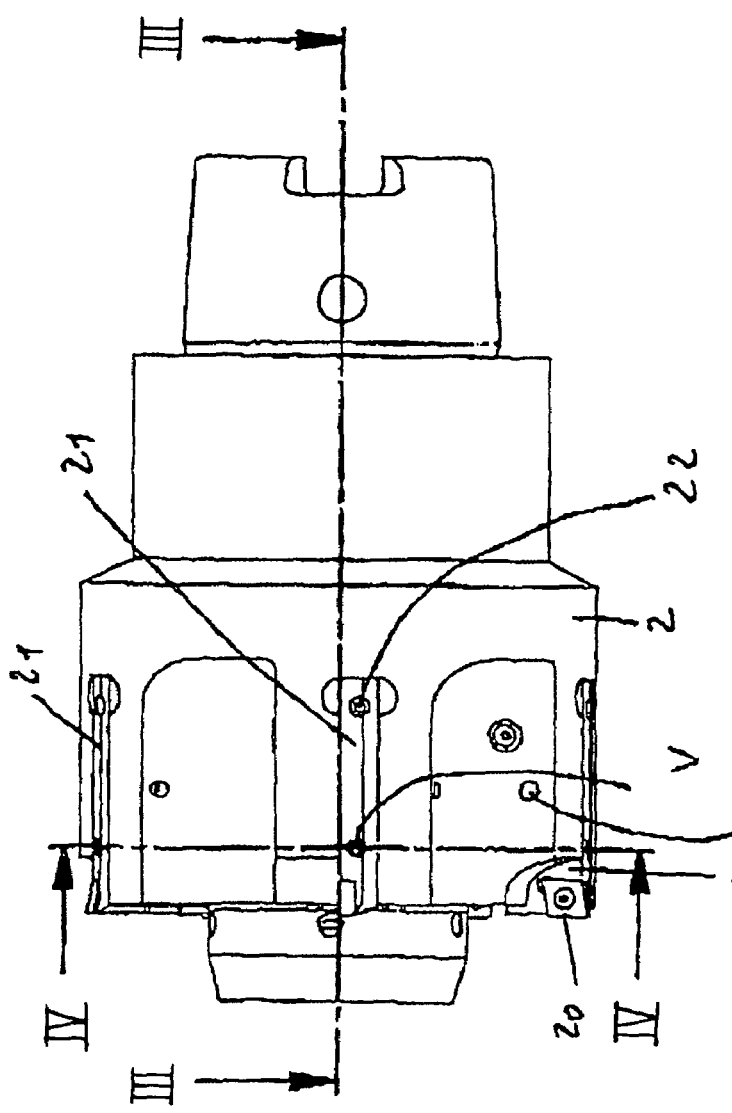
FIG. 2 is a diagrammatic side view of the cutting tool of FIG. 1.
Figure 3A:
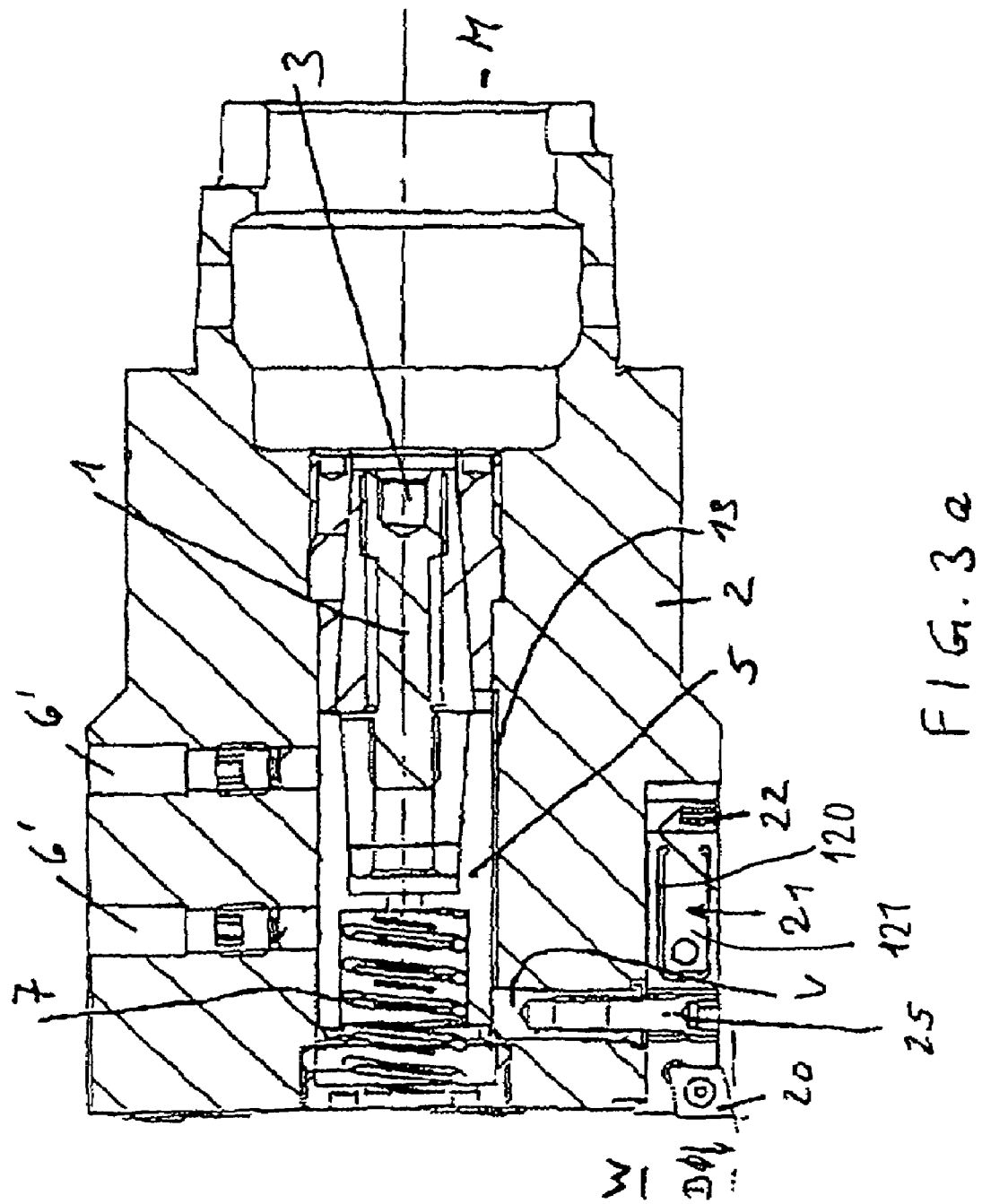

FIG. 3a shows a design of the tool with which facing operations are also possible on the workpiece W. Here, the pressure pieces V are replaced with a combination of pressure piece V and a pressure screw 25. The pressure screw 25 is mounted in pressure piece V and in the holder 21 or is guided in corresponding threads, so that an additional adjustment is possible here. The pressure piece V is formed from bronze or bearing metal. The screw, depending on the adjusting range or the selected infeed rate for the cutting tip 20 or the holder 21, can be provided with threads of different pitch—even with a pitch difference of the threads—for achieving the desired diameter D.

FIG. 3b shows a central adjustment device of a five-edged tool in which a multiple—spline groove 3' is provided on the side of the tool body 2' facing the workpiece W.

Figure 5:
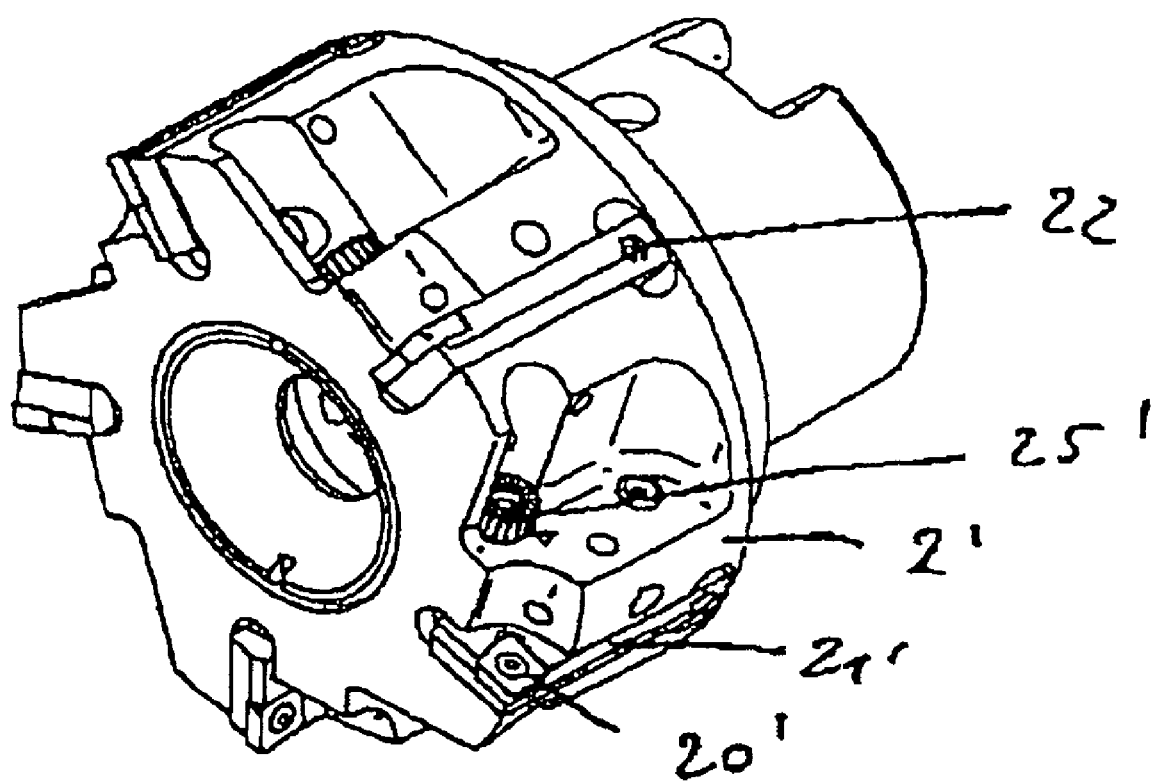
FIG. 5 is a perspective side view similar to FIG. 2, showing a tool with individual adjustment of the five cutting tips according to the present invention.

Finally, FIG. 5 shows a five-edged tool 2" with individual adjustment of the cutting tips 20' using corresponding adjusting screws 25'.

What is claimed is:

1. A multi-edged rotary tool for machining, comprising:
   a carrier;
   a plurality of holders, each holder of said plurality of holders having a front end and a rear end, said each holder being fixed to said carrier by a fastener received through a hole defined in said each holder between said front end and said rear end;
   a plurality of cutting tips respectively connected to said plurality of holders proximate said front ends, said each holder having an aperture therein and forming a parallel bending spring arrangement such that at least a portion of said each holder is elastically deflectable proximate said cutting tip; and
   an adjusting device comprising a differential screw threadably engaged in a first tapered inner sleeve having a tapered outer contour tapering in a first direction, a first outer sleeve having a tapered inner contour complementary to said first tapered inner sleeve and held thereon, and pressure pieces supported on at least a portion of said first outer sleeve, said pressure pieces radially movably holding said holders, wherein said first outer sleeve is axially movable in response to rotation of said differential screw and said holders are radially movable by said pressure pieces in response to an axial adjustment movement of said first outer sleeve.

2. The rotary tool of claim 1, wherein said at least a portion of said first outer sleeve on which said pressure pieces are supported comprises a pyramid-shaped portion.

3. The rotary tool of claim 1, wherein said carrier comprises a workpiece side facing a workpiece to be machined and a machine side for connection to a machine, said differential screw is rotatable by an engagement device from at least one of said workpiece side and said machine side.

4. The rotary tool of claim 1, wherein said first outer sleeve is mounted in said carrier such that radial movement of said first outer sleeve is prevented.

5. The rotary tool of claim 4, further comprising spring elements arranged between said first outer sleeve and said carrier, wherein said springs facilitate play-free interaction between said differential screw and said first outer sleeve.

6. The rotary tool of claim 1, wherein each of said pressure pieces comprises a pressure screw allowing an individual adjustment of each holder.

7. The rotary tool of claim 1, further comprising a second inner taper sleeve threadably having a tapered outer contour tapering in a second direction and engaged with said differential screw such that rotation of said differential screw produces axial movement of said second inner sleeve relative to said first inner sleeve.

8. The rotary tool of claim 7, further comprising a second outer sleeve arranged in said carrier and supporting said second inner taper sleeve relative to said carrier such that said first inner taper sleeve moves axially in response to rotation of said differential screw.

9. The rotary tool of claim 7, wherein said second direction is opposite of said first direction.

* * * * *